Patented July 8, 1930

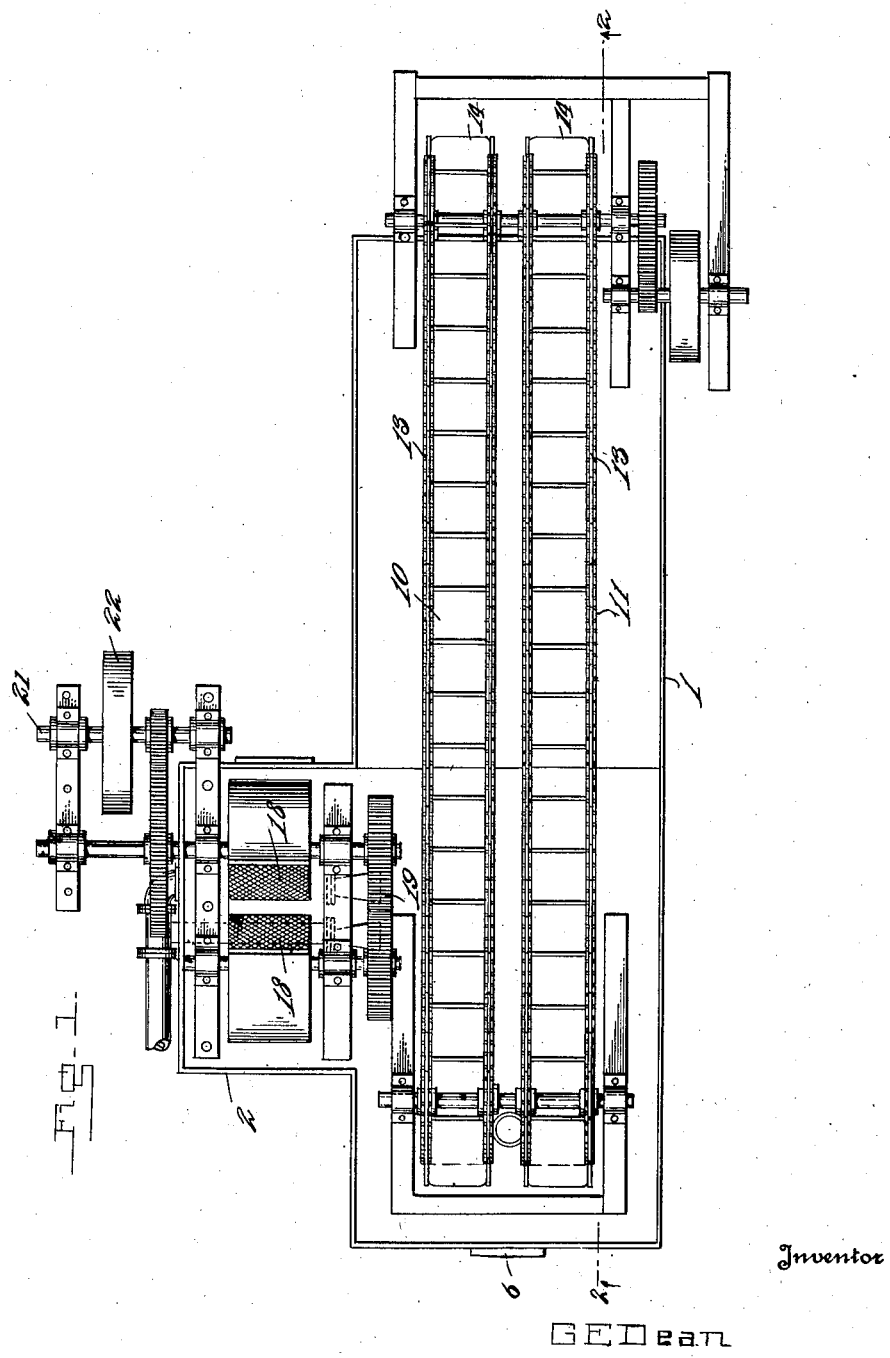

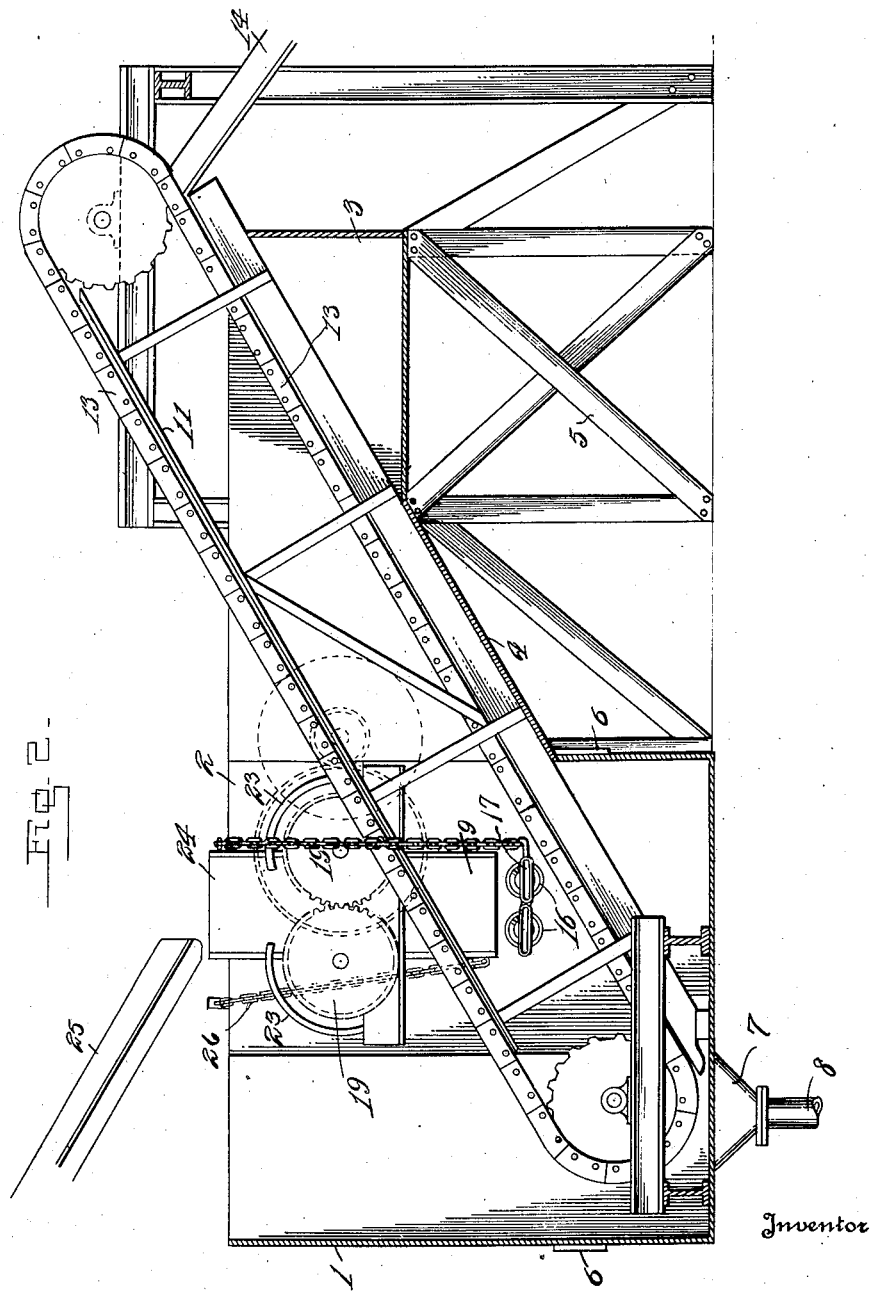

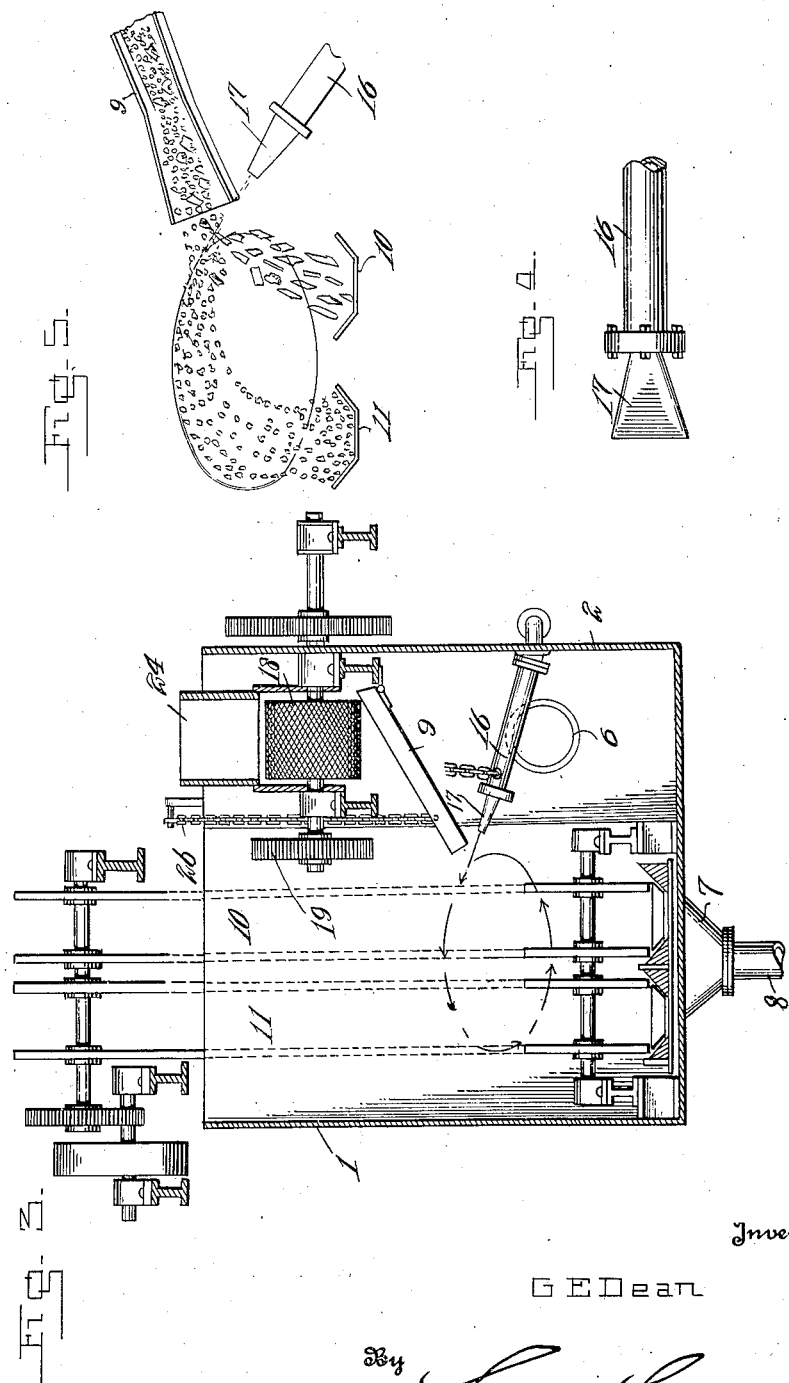

1,770,027

UNITED STATES PATENT OFFICE

GEORGE EDGAR DEAN, OF SCRANTON, PENNSYLVANIA

APPARATUS FOR COAL PREPARATION

Application filed December 7, 1926. Serial No. 153,149.

This invention relates mainly to an improved apparatus for preparing coal, especially hard coal, after it has been subjected to a breaking operation. It may perhaps apply to other minerals which have commingled with or attached to the primary substance other substances of different specific gravity.

It will be best understood if viewed in connection with the patent granted to Peter G. Seigle and George Edgar Dean (the present applicant) on March 15, 1927 No. 1,620,838, and which related mainly to a new way of breaking coal.

After coal has been broken it must pass through certain processes of preparation, particularly the separating out of impurities, such as rock and slate. In former times this separation was done by hand, but this has been found to be troublesome and unnecessarily expensive since the introduction of labor saving devices.

In the case of coal, the impurities have a higher specific gravity than the coal proper, and this property is taken advantage of in my apparatus, as herein described and elucidated.

In the practical embodiment of the invention, the coal or other substance to be treated and prepared for market, is reduced to required size, if too large, and the material is subjected to a special deflecting current to effect a separation, the heavier particles gravitating in advance of the lighter particles, any desired number of conveyors being provided and arranged to receive the particles of different specific gravity and deliver them separately as required, almost the entire operation being effected in a tank containing liquid in which the mechanism is wholly or partly submerged.

For a full understanding of the invention and the merits thereof reference is to be had to the following description and the drawings hereto attached, in which corresponding and like parts are referred to and designated in the several views of the drawings by like reference characters.

In the drawings:

Figure 1 is a top plan view of an apparatus embodying the invention and devised for carrying out the process.

Figure 2 is a vertical, longitudinal sectional view on the line 2—2 of Figure 1, looking in the direction of the arrows.

Figure 3 is a transverse sectional view of the apparatus.

Figure 4 is a detail view of one of the nozzles for delivering a lateral jet across the discharging substance to effect separation thereof.

Figure 5 is a detail view illustrating the manner of separating the substances.

The numeral 1 designates a tank which is adapted to be filled with liquid to within a short distances of the top thereof and this tank contains the operating parts essential to the carrying out of the process, such as breaking rolls, conveyors, a delivery chute and one or more nozzles for directing a deflecting current of liquid across the discharging solid substances from behind or beneath to effect a separation thereof. The tank 1 has a lateral extension 2 in which the breaking rolls, chute and special current creating means are located. The separating end portion of the tank having the lateral extension 2 is of maximum depth, whereas the delivery end portion is of minimum depth, as indicated at 3, in Figure 2, the intermediate portion 4 varying in depth and having its bottom portion upwardly and rearwardly inclined. This is shown most clearly in Figure 2. A suitable trestle work 5 supports the intermediate and delivery portions of the tank. Man-holes are provided in the walls of the tank for inspection, cleaning and other purposes, and are closed by suitable covers 6 which are retained in place by any determinate means to admit of ready removal of said covers when required. The lower portion of the tank is provided with a depression 7 which converges and has a drain pipe 8 connected thereto for carrying off the precipitate or residue. The drain pipe 8 is adapted to be provided with a valve which, when open admits of the settlings discharging from the tank. A chute 9 is located within the lateral extension 2 of the tank and inclines laterally and downwardly towards its inner or delivery end.

This chute is flanged and may be either plain or formed with diagonal corrugations and it is broadened or widened at its lower or delivery portion for spreading the coal, or other substance, under treatment. This obviates the necessity of providing a baffle plate. The long axis of the chute is preferably placed at right angles to the discharge flow from the breaking rolls, so as to catch the full breadth of the flow or discharge therefrom.

The object of this chute is to conduct the flow of coal and other solids just where it is desirable to have the discharge, and to broaden out this discharge. This chute is intended to be adjustable, especially as to its pitch.

Near the lower end of the chute, I place a plurality of conveyor lines 10 and 11, abreast of one another, preferably, but not necessarily at exactly similar levels, for receiving the coal and other solid substances from the above described chute. These conveyor lines are partially submerged in the tank, but have their upper portions above the general level of liquid in the tank, affording sufficient opportunity for the return flow of liquid to the tank before the discharging of the solids.

The conveyor lines are preferably supplied with interrupted partition plates 13 at their edges for confining the several products to corresponding conveyor lines. These sectional partition plates can be of any desirable material, shape and height, and those at the farther side of the last conveyor line should have numerous perforations or gauze inserts to prevent the escape of coal while encouraging the escape of the liquid.

At or near the upper portions of the conveyor lines are separate chutes 14, one for each conveyor line, to carry the different products to different receptacles or to other processes of separation or preparation.

Where found to be desirable, one or more of these discharge chutes can be arranged to feed the product, coal in most instances, into a secondary conveyor line or lift, preferably provided with buckets instead of scrapers, to prevent further attrition, fracture and consequent waste, while elevating the said product to any desired height for preparation and loading purposes.

Having described the conveyor lines 10 and 11, and the chute 9 for feeding them with the product of the breaking elements, I now proceed to the exceedingly important and novel action which takes place as the broken product leaves the chute that has collected it in its descent from the breaking elements, through the liquid with which the tank is filled, to be carried in its flight to the interior of the plural conveyor lines. Here an artificially produced special current of liquid is projected against the flow of solids, preferably from beneath, or behind, which tends to lift the lighter substances and carry them farther than the heavier material is carried. This produces an important process of separation.

In the case of coal, the heavy impurities, such as rock and slate tend to fall into the first conveyor line 10, while the coals falls into a succeeding line 11, and is carried to a different destination. This special impetus given to the liquid as the coal is leaving the conducting chute may be produced in various ways, such as the blowing in of air or purely mechanical agitation, but I prefer to pump in a flow of liquid through pipes 16 which receive their supply from the tank, taken at a convenient point, where it will not interfere with other operations.

These pipes 16 are made adjustable as to pitch, position and direction of flow, more particularly to their pitch, if necessary using a flexible hose connection. Each pipe terminates in a spreading nozzle 17.

It will be very readily understood that the lower extremities of the conveyor lines 10 and 11 should be placed well back of the position of the delivery chute from the breaking elements in order that the carrying or scraping elements may have sufficient freedom of action in receiving and elevating the solid materials.

A water seal is arranged around the revolving shaft where it enters the tank. As I construct the tank, but one seal of this kind is required and that is at the main drive-shaft for the breaking process.

The conveyor lines can be arranged to run at different speeds, the one exceeding that of another, and each line can have its speed-rate adjustable, so as to run at different speeds as may be required by varying conditions.

It is obvious that the coal will be thoroughly cleansed from its attached dirt before leaving the liquid of the general tank, and this saves the necessity of a special and separate washing process.

Regarding the saving of coal incident to my apparatus it should be noted that in the tank each piece of coal is constantly surrounded and supported by the liquid, being thus protected from excessive chipping and breaking.

It may be further said that the collecting of the coal and its impurities immediately after their leaving the breaking elements renders the "drop" a negligible quantity.

A very noticeable advantage inherent in my invention is that it provides for greater economy in breaker construction and operation. The breaking elements can by its employment be placed on or near the ground instead of installing them near the summit of a tall structure, where vibration is excessive.

A slight variation in the apparatus thus far described will provide for passing any desired sizes of coal, egg, stove, chestnut and pea, through the tank, through the separating process and up the conveyor, without passing it through the breaking elements at all. In the cases where this is desired, a separate receiving pan is provided into which the desired medium sizes of coal are directed and from this receiving pan conducted in a special chute to the same or a separate point for the process of separation to begin and thus be delivered to the conveyor lines above, below or at the point where the coal coming from the breaking elements is delivered.

Whether this coal is delivered at the same point as the other coal or not, it would doubtless call for the installation of more nozzles for applying the forced current of liquid to take care of the increased flow of coal where the separating process begins. I would prefer to introduce this additional coal into the conveyor lines at a point higher up than where the newly broken coal is delivered, provided elevations admit of this selection of position.

It will probably be found advantageous in most cases to run this coal that requires no further breaking over fine screens for the removal of dust, silt and perhaps very small sizes of marketable coal before immersion in the liquid tank.

If it is found in certain instances that the operation functions better on material of uniform size in making use of this improved apparatus, the sizes may be separated to take advantage of this condition.

The distinct advantage of this plan in many, if not most cases, is that such sizes as egg, stove, chestnut and pea coal will be largely freed from their rock and slate and thoroughly washed before passing to where they are sent forward to the screening operations.

The breaking elements consist of a pair of breaking rolls 18 which are connected by gearing 19 so that their opposing portions travel in the same direction to compel the coal or other substance to pass therebetween. The shaft of one of the crushing rolls passes through the outer wall of the tank and is geared to a shaft 21 provided with a band pulley 22 to receive power from a suitable source. The opening in the side of the tank through which the shaft passes is rendered water tight by means of a suitable packing applied thereto. The breaking rolls are located above the chute 9 to insure delivery of the broken material to the said chute. Guards 23 extend over the upper outer portions of the rolls 18. A hopper 24 directs the material from a chute 25 to the breaking rolls.

The delivery end of the chute 9 is vertically adjustable by means of chains, or other means, 26 and the delivery ends of the pipes 16 are likewise adjustable vertically. As the coal or other material drops from the delivery end of the chute 9 it meets with a specially directed current from the nozzles 17. This current is preferably in an upward direction and creates an eddy or swirl, represented by the arrows and dotted lines in Figure 3. This current tends to lift and deflect the solid materials and is so regulated as to admit of the particles of relatively high specific gravity dropping upon the conveyor 11. In the case of coal the heavier particles represent slate and other impurities. The lighter particles consist of the marketable product.

Having thus described the invention, I claim:

1. An apparatus for separating a commodity comprising particles of different specific gravity, the same comprising a tank containing liquid, a plurality of conveyors partly submerged in the tank and arranged side by side, a chute disposed at one side of the conveyors for receiving and delivering the commodity into the liquid, means for adjusting the inclination of the chute, inclined pipes disposed below the chute for creating a transverse current in the liquid of the tank to deflect the commodity and effect separation thereof, and means for adjusting the inclination of the pipes.

2. Apparatus for separating a commodity comprising particles of different specific gravity, the same including a tank having a lateral extension at the receiving end, both the tank and its lateral extension containing liquid, a plurality of conveyors disposed side by side and inclining upwardly and rearwardly and having their receiving ends submerged in the liquid of the tank and their delivery ends clear of said liquid, breaking means submerged in the liquid of the lateral extension, a chute below the breaking rolls to receive the commodity therefrom and deliver it into the liquid of the tank in a descending stream, means for adjusting the chute to varying angles, a nozzle disposed to create a current in the liquid of the tank to deflect the descending commodity across the conveyors to effect separation of its particles, and means for adjusting the nozzle to different angles to vary the deflection of the commodity in its descent through the liquid.

3. Apparatus for separating a commodity comprising particles of different specific gravity, the same comprising a tank having its receiving end of maximum depth and formed in its bottom with a converging depression for settlings, and having its delivery end of minimum depth, and its intermediate portion of varying depth and formed with an upwardly and rearwardly inclined bottom, and having a lateral extension, endless conveyors disposed side by side within the tank in parallel relation and inclining upwardly and rearwardly to a point above and in the rear of the tank, breaking means in the upper portion of the lateral extension, a chute below the breaking means to receive the material therefrom and deliver it intermediate the runs of the endless conveyors, and means within the said lateral extension for creating a current across the path of the commodity descending from the chute and over the lower runs of the endless conveyors to effect separation of the particles according to their difference of specific gravity.

In testimony whereof I affix my signature.

GEORGE EDGAR DEAN. [L. S.]